United States Patent
Iyer et al.

(10) Patent No.: US 8,665,819 B2
(45) Date of Patent: Mar. 4, 2014

(54) SYSTEM AND METHOD FOR PROVIDING MOBILITY BETWEEN HETEROGENOUS NETWORKS IN A COMMUNICATION ENVIRONMENT

(75) Inventors: Jayaraman Iyer, Santa Clara County, CA (US); Anand Padmanabha Iyer, Kerala (IN)

(73) Assignee: Cisco Technology, Inc., San Jose, CA (US)

( * ) Notice: Subject to any disclaimer, the term of this patent is extended or adjusted under 35 U.S.C. 154(b) by 228 days.

(21) Appl. No.: 12/488,151

(22) Filed: Jun. 19, 2009

(65) Prior Publication Data

US 2010/0325714 A1 Dec. 23, 2010

(51) Int. Cl.
*H04W 4/00* (2009.01)
(52) U.S. Cl.
USPC .................. 370/331; 455/432.2; 709/249
(58) Field of Classification Search
None
See application file for complete search history.

(56) References Cited

U.S. PATENT DOCUMENTS

| 8,537,822 | B2 * | 9/2013 | Montemurro et al. | 370/392 |
|---|---|---|---|---|
| 2006/0052099 | A1 * | 3/2006 | Parker | 455/426.1 |
| 2007/0021119 | A1 * | 1/2007 | Lee et al. | 370/338 |
| 2007/0025297 | A1 * | 2/2007 | Lee et al. | 370/331 |
| 2007/0160017 | A1 * | 7/2007 | Meier et al. | 370/338 |
| 2007/0217427 | A1 * | 9/2007 | Chung | 370/395.2 |
| 2007/0268908 | A1 * | 11/2007 | Linkola et al. | 370/395.2 |
| 2008/0004009 | A1 * | 1/2008 | Caldwell et al. | 455/434 |
| 2008/0107077 | A1 * | 5/2008 | Murphy | 370/331 |
| 2008/0192770 | A1 * | 8/2008 | Burrows et al. | 370/466 |
| 2009/0204725 | A1 * | 8/2009 | Liu et al. | 709/246 |
| 2009/0285176 | A1 * | 11/2009 | Zheng et al. | 370/331 |
| 2011/0038284 | A1 * | 2/2011 | Senarath et al. | 370/279 |

OTHER PUBLICATIONS

Iyer et al., Handling Mobility Across WiFi and WiMAX, Jun. 21-24 2009, ACM, IWCMC '09 Proceedings, pp. 537-541.*
Markus Bauer et. al., Comparison of Different Strategies for UMTS and WLAN Integration, presentation at the IP-based Cellular Networks (IPCN 2002) conference, Paris, France, Apr. 2002, 11 pages.
Alvarion, "The Disruptive Approach of Open WiMAX," White Paper, © 2007, 8 pages.

* cited by examiner

*Primary Examiner* — Timothy J Weidner
(74) *Attorney, Agent, or Firm* — Patent Capital Group (57) ABSTRACT

A method is provided in one example embodiment and includes providing an Internet Protocol (IP) address based on an authentication request associated with a device, the authentication request being associated with a Wi-Fi protocol. The method also includes identifying a Wi-Fi event associated with the IP address, and mapping the Wi-Fi event to a WiMax event. Further, the method includes providing a WiMax message, which is based on the Wi-Fi event, to a network element. In other embodiments, the mapping further includes converting the Wi-Fi event to the WiMax message such that the WiMax message is presented to the network element in a WiMax format. The same IP address can be used for both the Wi-Fi event and the WiMax message. In yet other embodiments, the method includes communicating a disconnection request to the network element when the device moves from a Wi-Fi coverage area to a WiMax coverage area, mapping a new WiMax event to a new Wi-Fi event, and providing a Wi-Fi message, which is based on the new WiMax event, to the device.

20 Claims, 3 Drawing Sheets

| MAPPING BETWEEN WIFI AND WIMAX EVENTS | |
|---|---|
| R6 NETWORK EVENT | 802.11 EVENT |
| MOBILE STATION PRE-ATTACHMENT REQUEST | ASSOCIATION REQUEST |
| MOBILE STATION ATTACHMENT RESPONSE | ASSOCIATION RESPONSE |
| RE-AUTHENTICATION | RE-ASSOCIATION REQUEST |
| EAP TRANSFER | EAP START |
| EAP REQUEST IDENTITY | EAP IDENTITY REQUEST |
| EAP RESPONSE IDENTITY | EAP IDENTITY RESPONSE |
| DE-REGISTRATION | DISASSOCIATION |

| MAPPING BETWEEN WIFI AND WIMAX EVENTS ||
|---|---|
| R6 NETWORK EVENT | 802.11 EVENT |
| MOBILE STATION PRE-ATTACHMENT REQUEST | ASSOCIATION REQUEST |
| MOBILE STATION ATTACHMENT RESPONSE | ASSOCIATION RESPONSE |
| RE-AUTHENTICATION | RE-ASSOCIATION REQUEST |
| EAP TRANSFER | EAP START |
| EAP REQUEST IDENTITY | EAP IDENTITY REQUEST |
| EAP RESPONSE IDENTITY | EAP IDENTITY RESPONSE |
| DE-REGISTRATION | DISASSOCIATION |

SYSTEM AND METHOD FOR PROVIDING MOBILITY BETWEEN HETEROGENOUS NETWORKS IN A COMMUNICATION ENVIRONMENT

TECHNICAL FIELD

This disclosure relates in general to the field of communications and, more particularly, to providing mobility in a network environment.

BACKGROUND

Networking architectures have grown increasingly complex in communication environments. Multi-access networks (e.g., Wi-Fi and WiMax) have gained notoriety in recent times. WiMax can enable the delivery of last mile wireless broadband access as an alternative to wired broadband (like cable and DSL). WiMax can provide fixed, nomadic, portable, and mobile wireless broadband connectivity without the need for a direct line-of-sight with a base station. Most techniques for handling mobility are focused on a single technology, while few solutions account for different network protocols. Multi-access networks pose a number of problems. For example, issues can arise for user identification, along with coordinating mobility across disparate networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes providing an Internet Protocol (IP) address based on an authentication request associated with a device, the authentication request being associated with a Wi-Fi protocol. The method also includes identifying a Wi-Fi event associated with the IP address, and mapping the Wi-Fi event to a WiMax event. Further, the method includes providing a WiMax message, which is based on the Wi-Fi event, to a network element. In other embodiments, the mapping further includes converting the Wi-Fi event to the WiMax message such that the WiMax message is presented to the network element in a WiMax format. The same IP address can be used for both the Wi-Fi event and the WiMax message. In yet other embodiments, the method includes communicating a disconnection request to the network element when the device moves from a Wi-Fi coverage area to a WiMax coverage area, mapping a new WiMax event to a new Wi-Fi event, and providing a Wi-Fi message, which is based on the new WiMax event, to the device.

Figure 1:
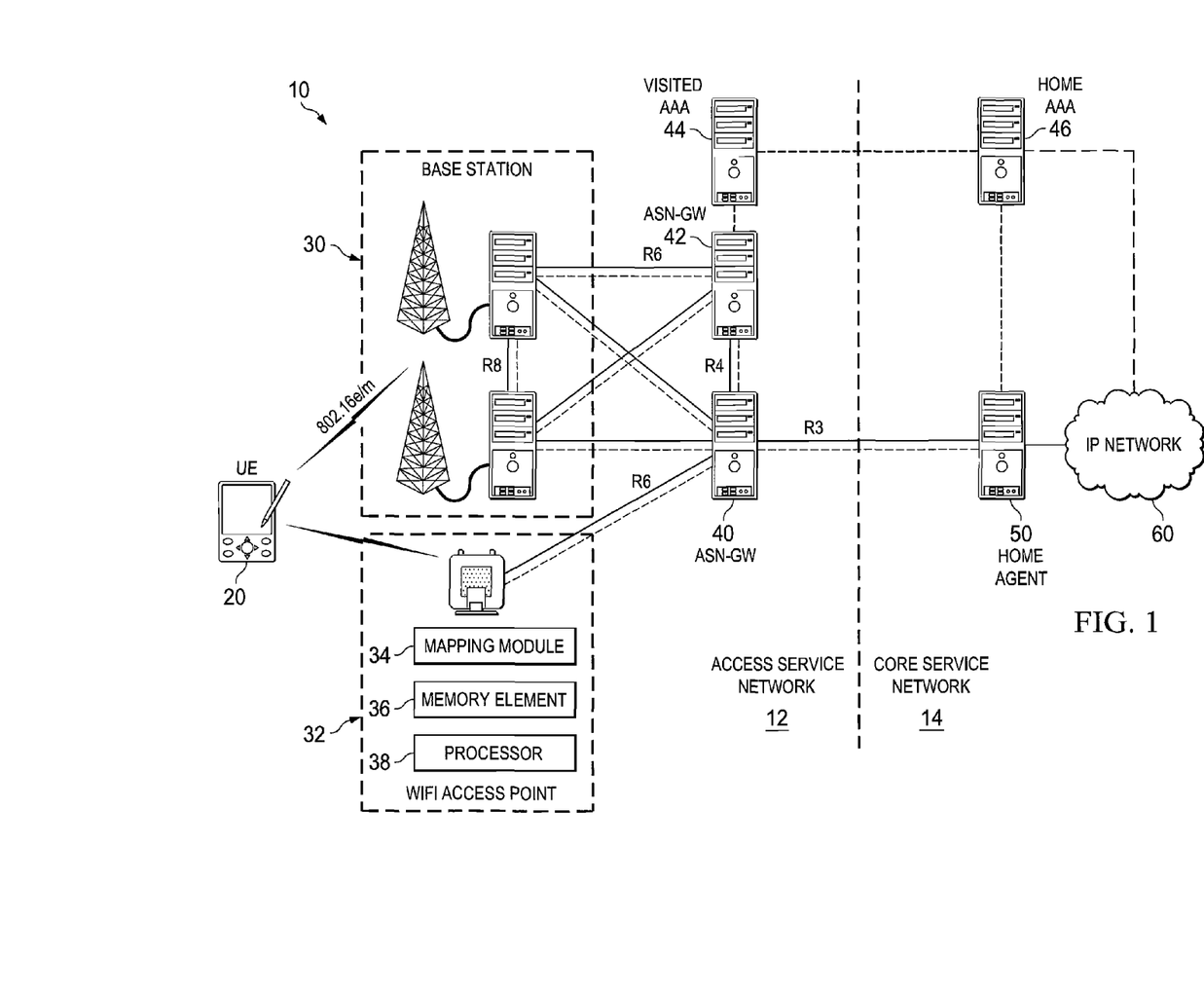
FIG. 1 is a simplified block diagram of a communication system for providing mobility in a network environment in accordance with one embodiment of the present disclosure.

Turning to FIG. 1, FIG. 1 is a simplified block diagram of a communication system 10 for provisioning mobility in a network environment. FIG. 1 may include an access service network (ASN) 12, a core service network 14, user equipment (UE) 20, a set of base stations 30, several ASN gateways (ASN-GWs) 40 and 42, a visited authentication, authorization, and accounting (AAA) element 44, and a home AAA element 46. FIG. 1 may also include a Wi-Fi access point 32, which includes a mapping module 34, a memory element 36, and a processor 38. A single home agent 50 is also provided in core service network 14, which may also include an Internet Protocol (IP) network 60.

Communication system 10 may include multiple instances of UE 20, which can be coupled to multiple base stations 30 and Wi-Fi access point 32 through a suitable interface (e.g., an R1 interface in a WiMax implementation). In one example, each base station (BS) and each Wi-Fi access point 32 may be coupled to a respective access service network gateway, which may further include a combined foreign agent in some example implementations. The interaction between base stations 30 and Wi-Fi access point 32, and ASN-GWs 40 and 42 may occur through a series of interfaces (e.g., the R6 interface). Another interface (e.g., the R8 interface) may be used by the base stations to communicate with each other.

In one example embodiment, the R1 interface is the radio wireless interface between a WiMax terminal and the base station. Its protocol could be defined by IEEE 802.16d/e, which provides quality of service (QoS) policy parameters. The R6 interface standard is provided by the WiMax Forum Network Working Group (NWG). The R4 interface accommodates mobility between two ASN-GWs. The R3 interface is provided between access service networks and connectivity service networks (CSNs).

For purposes of illustrating some example techniques of communication system 10, it is important to understand the communications that may be traversing the network and which provide routing information to any given network element. The following foundational information may be viewed as a basis from which the present disclosure may be properly explained. Such information is offered earnestly for purposes of explanation only and, accordingly, should not be construed in any way to limit the broad scope of the present disclosure and its potential applications. The 3GPP 23.827 protocol requires two separate paths from a WLAN infrastructure: one to the Internet side and a second to the 3G side. This implies changes to the common WLAN infrastructure. Analyzing the handovers across two access networks (e.g., such as Wi-Fi and WiMax) reveals that a significant amount of time is spent in authentication.

Communication system 10 can offer an optimized architecture to handle Wi-Fi and WiMax mobility, while delivering low latency handovers. One model of communication system 10 allows Wi-Fi access point 32 to connect [using the R6 interface] to the WiMax ASN-GW, which enables a common access anchor across Wi-Fi and WiMax. In regards to client device authentication/security virtualization, the client device virtualization function allows the client to map a common MAC address/device identity to be used across multiple access networks. In the context presented herein, this could apply to Wi-Fi (802.11) and WiMax (802.16e). This allows the same authentication and security framework to be applied to underlying Wi-Fi and WiMax links. Additionally, for the R6 mapping function at the Wi-Fi access point, the objective is to keep mobility across Wi-Fi and WiMax seamless (such that it gives the semblance of a single access mechanism). The mapping function, and its relationship to an ASN-GW, can be enabled on a SSID basis. [The SSID (Service Set Identifier) is a token, which identifies an 802.11 (Wi-Fi) network.] This allows the same access link to multiple ASN-GWs. Note that in typical deployments, the SSID is a secret key that is set by the network administrator. An end user can use the SSID to join an 802.11 network.

In one example implementation, Wi-Fi events are appropriately mapped to WiMax events (e.g., R6 events) so that client associations, extensible authentication protocol (EAP), and security are translated back to the ASN-GW mode of operation. R6 events from the Wi-Fi access point can be tagged with an access type of Wi-Fi. [One example mapping between Wi-Fi and WiMax is provided by FIG. 2 and this data table is described in detail below.] For the device-identity mapping function at the ASN-GW, the ASN-GW can map Wi-Fi and WiMax devices, which are used under the same user identity, together by using a policy function. This allows the ASN-GW to validate specific device usage, as well as handle mobility across the two radio interfaces (e.g., Wi-Fi and WiMax).

In addition, there is a common user authentication method (e.g., EAP-Tunneled Transport Layer Security (TTLS)) being applied across multiple access interfaces in a transparent manner. In one example implementation, there is an optional multi-registration mechanism at the ASN-GW. Wi-Fi access point 32 and/or the WiMax base station may be allowed to facilitate network initiated handover scenarios. These handover scenarios can include parameters such as the signal strength used for connecting access, timestamps of access, etc. Also, the approach outlined herein can be used for a consistent policy and quality of service (QoS) mechanism across Wi-Fi and WiMax. The R6 mapping at the access point can apply the WiMax QoS mechanisms to Wi-Fi, allowing a consistent QoS understanding across Wi-Fi and WiMax protocols.

In using a common architecture across Wi-Fi and WiMax (e.g., in using a MAC virtualization at the client and an R6 mapping at the network to allow both Wi-Fi and WiMax to be managed by a single mobility gateway (ASN-GW)), a number of advantages may be achieved. For example, such an architecture allows a low latency handover/mobility solution across Wi-Fi and WiMax. Also, such an approach keeps the IP address intact, and accommodates weak coverage on one of the two radio networks. Additionally, such an approach allows mixed coverage of WiMax networks with Wi-Fi in a seamless fashion. Moreover, such a solution can offer a single client identity across Wi-Fi and WiMax when being employed under the same operator. It further allows an easier integration of the Wi-Fi access point [based on SSID] into the WiMax network.

Some of these activities and features can be best understood in the context of an example. Consider a service scenario where an end user, Bob, has a handheld device (e.g., represented by UE 20) such as a PDA or a laptop with both 802.11 and 802.16 capabilities. Bob signs up with a provider that offers connectivity using 802.11 or 802.16. The provider offers Bob a connectivity option package, "Any access, always connected." Bob is a businessperson, who travels constantly, and who expects a seamless experience to all network services (including voice). The service provider seeks to facilitate a seamless roaming experience across Wi-Fi and WiMax. Typically, many indoor areas are covered using 802.11, and outdoor areas can be covered with 802.16, where a seamless experience can exploit this environment to facilitate a lower cost radio network.

There are several challenges for a service provider in this instance. First, the service should account for how the 802.11 network interacts with a WiMax provider's 802.16 network. Second, the service provider should consider if there is a cost-effective model that facilitates a partner Wi-Fi access point to be connected to the WiMax provider's network. Third, the service provider should account for how mobility is handled across the 802.11 and 802.16 protocols, while latency is kept to a minimum. Fourth, the service provider should account for having two sets of credentials: one for Wi-Fi and one for WiMax.

Note that common to both 802.11 and 802.16 networks, control plane messages are used to establish and tear down connections between different entities in a network. In regards to a user (Bob) roaming between Wi-Fi and WiMax networks (e.g., a user roams between networks connected between the same mobility anchor), the following could occur. In this instance, Bob has a multi-mode capable Network Interface Card (NIC). Initially, Bob is in an area where Wi-Fi coverage is fine for his needs. His NIC initiates a connection to an access point (e.g., Wi-Fi access point 32) using an association request that is mapped to a pre-attachment request. The request is forwarded to a suitable anchor (e.g. ASN-GW 40). Since this is Bob's initial connection, a full authentication is performed. An EAP Request from the AAA server (e.g., home AAA 46) is communicated to the NIC, which then provides its credentials. Once the authentication returns a success indication, a mapping function (e.g., provided in mapping module 34) triggers an attachment request, whose result is returned back to Bob's NIC (as an association response).

Once a connection is established, the NIC's dynamic host configuration protocol (DHCP) requests are forwarded by the mapping function (e.g., mapping module 34) to the DHCP server, and the assigned IP address can be cached before forwarded to the NIC. The data plane is now established, and Bob can access services from his provider.

Now consider Bob when he is mobile (i.e., Bob moves away from the Wi-Fi hotspot, and at a certain point the signal strength is below the threshold for sustaining the connection). However, imagine that WiMax coverage is available in his new area. The NIC can now connect through the WiMax network. When Bob roams away from the Wi-Fi coverage, the access point (Wi-Fi access point 32) can send a disconnection notification to the mobility anchor (ASN-GW 40). Now, Bob connects through the WiMax card. Note that in this case, Bob's request is routed to the same anchor, which recognizes him as a roaming client. Thus, a fresh authentication is avoided, and re-authentication is completed in a fraction of the time required for complete authentication. The DHCP server can assign the same IP address as earlier, which completes the seamless handover.

An end user operating user equipment 20 has the option to connect to the network via, for example, a WiMax base station or Wi-Fi access point 32. Typically, when an end user connects to a Wi-Fi interface and to a WiMax interface, there are two devices present. Indirectly, this would be represented with two IP addresses, which need to be coordinated for conducting respective sessions. In contrast to this implementation, even in cases where an end user connects to both interfaces, a single device could exist in the network (e.g., from the perspective of the service provider). Regardless of how an end user is connecting, a single IP address can be used. This engenders the ability to provide a low latency solution.

In one generic sense, the access point talks Wi-Fi to its clients and WiMax to the ASN-GW. FIG. 1 offers an architecture with a common Wi-Fi/WiMax mobility service agent for use across Wi-Fi and WiMax access. In a WiMax network, the ASN-GW is a network element that provides mobility in conjunction with multiple WiMax base stations. By incorporating a correct mapping mechanism between Wi-Fi and WiMax, a Wi-Fi access point can also interface to the WiMax ASN-GW. This enables a Wi-Fi/WiMax mobility service agent to be easily created using an ASN-GW. Thus, in example embodiments of the architecture, the problem of handling mobility across Wi-Fi and WiMax platforms is actually just the issue of handling mobility across WiMax base stations, which has already been suitably resolved.

In offering a low latency mobility scheme, the proposed architecture can employ Wi-Fi access point 32 as a WiMax base station. In particular, one embodiment can offer a mapping function being provided in Wi-Fi access point 32 to handle mobility across Wi-Fi and WiMax. The mapping function can map events between 802.11 and R6 events and, thus, allows the device to appear as a normal access point to the client, and a normal WiMax base station to the ASN-GW. An added advantage to this approach is that the client and the ASN-GW are not necessarily aware of the mapping taking place in the access point. Hence, in one example implementation, hardware or software changes can be avoided at these entities.

Before turning to some of the operations of this architecture, a brief discussion is provided about some of the infrastructure of FIG. 1. UE 20 can be associated with clients or customers wishing to initiate a communication in communication system 10 via some network. The term 'user equipment' is inclusive of devices used to initiate a communication, such as a computer, a personal digital assistant (PDA), a laptop or electronic notebook, a cellular telephone, an IPHONE™, an IP phone, or any other device, component, element, or object capable of initiating voice, audio, video, or data exchanges within communication system 10. UE 20 may also be inclusive of a suitable interface to the human user, such as a microphone, a display, or a keyboard or other terminal equipment. UE 20 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, or script data, or any type of source or object code, or any other suitable information in any appropriate format that may be communicated from one point to another.

ASN-GWs 40 and 42 are network elements that facilitate service flows between endpoints and a given network (e.g., for networks such as those illustrated in FIG. 1). As used herein in this Specification, the term 'network element' is meant to encompass routers, switches, gateways, bridges, loadbalancers, firewalls, servers, processors, modules, or any other suitable device, component, element, or object operable to exchange information in a network environment. The network elements may include a foreign agent or, alternatively, the network elements may simply be configured to interact with a foreign agent and this architecture may depend on whether mobile IP is supported. Thus, the network elements and the foreign agents may be provided separately as their own independent elements. Moreover, the network elements may include any suitable hardware, software, components, modules, interfaces, or objects that facilitate the operations thereof. This may be inclusive of appropriate algorithms and communication protocols that allow for the effective exchange of data or information. In operation, the ASN-GWs can provide mobility support in WiMax networks by servicing multiple base stations. An extension of this scheme is the concept of an anchored mobility service that is based on SSID membership, which allows flexibility to enable or disable Wi-Fi/WiMax mobility based on certain configurations. Additionally, such an implementation can provide the capability for a single access point to interface with multiple mobility service agents.

Wi-Fi access point 32 is a wireless access point element that allows wireless communication devices to connect to a wireless network using Wi-Fi, Bluetooth, 802.XX, or related standards. In certain examples, Wi-Fi access point 32 can facilitate WiMax connectivity (and help coordinate such activity). This may include assistance from mapping module 34, which can map events between two protocols, as outlined herein. Wi-Fi access point 32 can connect to a wired network, and can relay data between the wireless devices (e.g., computers or printers) and wired devices on the network.

Mapping module 34 offers a Wi-Fi to WiMax event mapping function. In one example, this feature can run as a daemon/service inside a given access point (and, further, is activated upon boot up). In one non-limiting sense, it acts as an intermediary, triggering appropriate WiMax R6 events using Wi-Fi triggers, and vice-versa as described herein. For control plane modifications, since reference point R6 can use UDP packets over a default port (e.g., port 5000 in one implementation), mapping module 34 incorporates logic to understand reference point R6 events, as well as Wi-Fi events. In one implementation, mapping module 34 implements a number of state machines that simulate the WiMax behavior for every Wi-Fi client connecting to the access point. These state machines could be similar to the 802.11 state machines. Also potentially incorporated into mapping module 34 (e.g., in state machines) is a state relation between Wi-Fi and WiMax. In one example, clients connecting to the access point are virtually converted as a WiMax client (e.g., for the associated gateway) by mapping module 34. For the data plane, WiMax can provide for the use of IP packets encapsulated in GRE tunnels.

In one example implementation, Wi-Fi access point 32 includes software to achieve the mapping operations, as outlined herein in this document. In other embodiments, this feature may be provided external to Wi-Fi access point 32 or included in some other network device to achieve this intended functionality. Alternatively, network elements (e.g., ASN-GW 40 or 42) and Wi-Fi access point 32 include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Home AAA element 46 and visited AAA element 44 are server programs that handle requests [from other network elements on behalf of user equipment] for access to networking resources. Networking resources refers to any device, component, or element that provides some functionality to endpoints communicating in communication system 10. For a corresponding network, AAA elements [i.e., visited AAA element 44 and home AAA element 46] may also provide authentication, authorization, and accounting services and management. Authorization generally refers to the process of giving endpoints permission to do or to access something. In multi-user computer systems, a system administrator may define for the system which end users are allowed access to particular data in the system and, further, what privileges are provided for endpoints. Once an end user has logged into a network, the network may wish to identify what resources the end user is given during the communication session. Thus, authorization within communication system 10 may be seen as both a preliminary setting up of permissions by a system administrator and the actual checking or verification of the permission values that have been set up when the end user is attempting access. Authentication generally refers to the process of determining whether the end user is in fact who or what it is declared to be.

AAA elements typically interact with network access servers and gateway servers, and with databases and directories containing user information. One standard by which devices or applications communicate with an AAA element is through a Remote Authentication Dial-In User Service (RADIUS) protocol, while other standards that could be employed include the Terminal Access Controller Access Control System (TACACS) or DIAMETER protocols.

AAA elements may receive the IP address and other parameters from any suitable source, such as a dynamic host configuration protocol (DHCP) server or a domain name system (DNS) database element, in order to direct data to be communicated to an end user. The AAA element may include any suitable hardware, software, component, or element that operates to receive data associated with an end user and that provides corresponding AAA related functions to network components within communication system 10. In operation, home AAA element 46 can be configured with one home agent IP address. Authorization and IP address management may also be retrieved by the AAA element from a layer two tunneling protocol network server (LNS), which may be provided to address secure services for the end user where appropriate. The assigned IP address may be a private VPN or a public IP address. On assignment of the IP address, the DHCP server may perform update procedures for updating the assigned IP address and leasing parameters for the end user.

Home agent 50 can cooperate with DHCP servers during IP registration in order to assign an IP address to end users. On authentication, an end user may be assigned an IP address by the home agent. The DHCP server may subsequently update the DNS database before returning the IP address and other provisioned parameters to an end user. An IP tunnel may be established between the network and the home agent to enable secure end-to-end packet transport.

The foreign agents (FA) [potentially included within aforementioned ASN-GWs 40 and 42] are routing elements that could also be included within a network access server (NAS) in a network that allows a node to utilize a home network address. The foreign agent can tunnel datagrams to, and detunnel datagrams from, the home agent for the given home network.

ASN-GW 40 can provide access gateway functions between the wireless domain and the IP network. In example embodiments, it can be the first hop IP router from the user's perspective and, further, provide NAS and accounting client capabilities for interaction with AAA servers. ASN-GW 40 can support access network authentication and security functions. ASN-GW 40 can also provide local mobility anchor capability so that users can move between base stations. ASN-GW 40 also caches authentication and security information to accommodate fast roaming of users across base stations or between ASN-GWs 40 and 42. ASN-GW 40 can provide the termination of the mobility function across base stations and the foreign agent function. ASN-GW 40 can also map the radio bearer to the IP network. Additionally, it acts as an IP gateway for the IP host function that is located on the base station. In certain examples, ASN-GW 40 can offer IP functions performed for the access network including end-to-end quality of service, mobility, and security.

In regards to latency issues, it should be noted that any mobility scheme can result in a disruption in connections, at least for a short period of time during handoff. Hence, latency is an important parameter that needs to be addressed. This issue gains particular importance when networks are expected to support voice and video applications, which demand low latency. Typically, a wireless handoff procedure comprises several major events: discovery, connection, and data plane setup. First, the mobile node scans and discovers potential networks to which to connect. Once this has been done, it now connects to the selected network. The final step is to set up the data plane by obtaining an IP address through DHCP. In this scenario, let T be the total delay during handoff, and then this delay could be represented as:

$$T = t\text{discover} + t\text{connect} + t\text{dhcp}$$

During the connection phase, a mobile node re-associates and authenticates. Thus, for this connection phase:

$$t\text{connect} = t\text{associate} + t\text{authenticate}$$

Typical authentication in enterprise Wi-Fi networks is done using 802.1x with EAP. Events during the handover process account for significant delays. Authentication and DHCP events account for a major portion of these delays. The DHCP delay can be optimized by increasing lease times. Similarly, authentication delays could be reduced by using cached keys. However, none of these techniques works in heterogeneous network handovers.

A typical handover from Wi-Fi to WiMax would result in a latency of about 4 seconds, which inhibits the purpose of a mobility solution. In contrast, the mobility scheme outlined herein achieves improvements over this handover delay because it saves on DHCP and authentication delays. This is possible because DHCP and authentication are problematic in the scheme. Further, improvements are possible by the reuse of same session keys.

Turning to some of the example frames that may be used in communication system 10, management frames can be used to establish and maintain connections. The different frames that fall under the management category include a beacon frame, which is used by Wi-Fi access point 32 to periodically send information about its presence. The information transmitted includes the timestamp, SSID, etc. NICs can continually scan for the beacon to select an appropriate access point to which to associate. The probe request frame is used to obtain information from a station. The probe response frame is a response to a probe request frame, and is similar to the beacon frame. It can consist of capacity information, supported data rates, etc.

The authentication frame is used during the authentication process. The 802.11 authentication process is not to be confused with the 802.1X link layer network authentication of users. The 802.11 authentication requests a mobile station to establish its identity before sending frames. At this level of authentication, there is no data encryption. The standard defines two types of authentication. First, the open systems authentication consists of two communications—the client sends an authentication request to the access point (AP), and the AP sends an authentication response containing success or failure message. If MAC filtering is enabled, failure may occur at this level. This is the default type of authentication. Here, the client (e.g., the NIC) sends only one authentication frame, and the AP responds with a response frame. Second, the shared key authentication relies on the fact that both the parties participating in the process have some shared key or pass phrase. There are several types of shared key authentication available such as: Wired Equivalent Privacy (WEP), Wi-Fi Protected Access (WPA), Wi-Fi Protected Access 2 (WPA2), etc. In shared key authentication, the NIC sends an initial authentication frame, and the AP responds with an authentication frame containing the challenge text. The NIC has to send back another authentication frame containing the encrypted challenge text using the shared key. The AP checks if the encryption is correct, and sends a response frame.

A deauthentication frame is sent when the communication between two parties is to be terminated. When deauthentication takes place, the client is automatically disassociated. For the association request frame, the Wi-Fi association request enables an access point to allocate resources to a client, and to synchronize with it. It is within this frame that data rates and other parameters are negotiated. A client sends an association request frame with information about itself to the SSID with which it desires to associate.

The association response frame is used by the access point to provide the status of the association request from a client. If the access point accepts the request, it reserves memory space for the client, and establishes an association ID for the client. In case a client associated with a particular access point roams away from it, or it finds another access point with a stronger beacon, it will send a reassociation request frame to the new access point. The new access point can then coordinate the forwarding of data frames that are still in the buffer of the previous access point. The reassociation response frame indicates the outcome of a reassociation request. Similar to the association process, the frame includes information regarding the association, such as association ID and supported data rates. The disassociation frame is used to indicate the termination of an association so that the access point can release the resources reserved.

Control frames assist in the delivery of data frames. Some of the most common control frames include the request to send (RTS) frame. The RTS/clear to send (CTS) function is optional and reduces frame collisions present when hidden stations have associations with the same access point. A station sends a RTS frame to another station as the first phase of a two-way handshake used before sending a data frame. A station responds to a RTS frame with a CTS frame, providing clearance for the requesting station to send a data frame. The CTS frame includes a time value that causes all other stations (including hidden stations) to hold off transmission of frames for a time period necessary for the requesting station to send its frame.

After receiving a data frame, the receiving station will utilize an error checking processes to detect the presence of errors. The receiving station will send an acknowledgement (ACK) frame to the sending station if no errors are found. If the sending station does not receive an ACK after a period of time, the sending station will retransmit the frame. Data frames can carry data from higher layers (e.g., DHCP process, TCP data, etc.).

EAP can be used in Wi-Fi to provide authentication functionalities. However, this authentication may differ from the Wi-Fi authentication described earlier. For example, at a first step, when a client attempts to connect to an access point, the EAP handshake process begins. At step two, an access point establishes a port for EAP-only traffic and asks the client for an identity. At a third step, the client responds and then the access point requests authentication from the server. At a fourth step, if a client is authenticated, the access point will accept traffic.

It should be noted that the EAP authentication is generally triggered after the Wi-Fi authentication process and at the start of the association. The process can be briefly described as follows: 1) the client requests association with the AP; 2) the AP replies to the association request with an EAP identity request; 3) the client sends an EAP identity response to the AP; 4) the client's EAP identity response is forwarded to the authentication server; 5) the authentication server sends an authorization request to the AP; 6) the AP forwards the authorization request to the client; 7) the client sends the EAP authorization response to the AP; 8) the AP forwards the EAP authorization response to the authentication server; 9) the authentication server sends an EAP success message to the AP; and 10) the AP forwards the EAP success message to the client and places the client's port in forward mode.

As outlined above, mobility in the WiMax access network can be handled by the ASN gateway, which typically resides at the operator's premise: connecting and servicing multiple WiMax base stations. Interaction between an ASN gateway and a base station can be done through the R6 reference point. The following are example R6 messages that can be utilized in a given network. A mobile station (MS) pre-attachment request is used by the base station to signal the ASN-GW about an arrival of a new MS. The MS pre-attachment response is used to communicate the authentication policy. For the MS pre-attachment acknowledgment, the base station sends an acknowledgment for the pre-attachment response. The EAP transfer consists of a series of messages used to transfer the authentication procedure messages. A key change directive is sent by the ASN-GW to indicate the completion of an EAP authentication procedure. The key change acknowledgment serves as an acknowledgment, indicating the receipt of a key change directive. The MS attachment request is initiated by the base station, which contains the MS registration context. The MS attachment response indicates the completion of the MS attachment with the ASN-GW. The MS attachment ACK serves as an acknowledgment to the ASN-GW, indicating the completion of the MS attachment (hence, triggering service flow creations).

Figure 2:
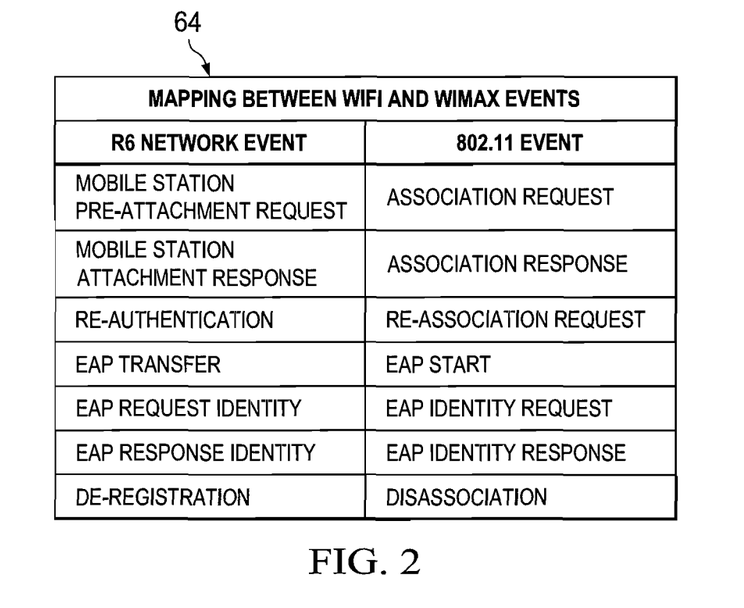
FIG. 2 is a simplified block diagram illustrating potential mappings for the communication system in one example implementation.

FIG. 2 is a simplified block diagram illustrating potential mappings 64 for communication system 10 in one example implementation. In one example, FIG. 2 describes the various events that occur during the connection establishment phase. These mappings could be provided in any database, register, control list, or storage structure: all of which can be referenced at any suitable timeframe. Any such storage options may be included within the broad term 'data table' as used herein in this Specification. The connection establishment ends when an association response is received at the client. The mappings between Wi-Fi and WiMax events for Initial Network Entry are shown in FIG. 2. The access point can act as a relay for the DHCP messages exchanged between the client and a DHCP server, starting with the request made by the client. The WiMax R6 data plane can utilize generic routing encapsulation (GRE) to route packets. Thus, in addition to the mapping function identified above, the access point can encode and decode GRE packets.

For connection establishment, both WiMax and Wi-Fi can use special messaging to set up and tear down connections. For an event-based model, specific relationships can be established between the various events in Wi-Fi and WiMax. For instance, a WiMax connection establishment can be initiated using a pre-attachment request (e.g., as described by reference point R6). A Wi-Fi client can initiate its attachment process with an access point using an association request. Hence, a Wi-Fi association request can be directly mapped to a WiMax pre-attachment request. Similarly, various events that happen upon connection establishment in Wi-Fi and WiMax can be mapped.

Communication system 10 can handle authentication across heterogeneous networks. The same event-based approach can be applied by mapping different events in 802.1x authentication [e.g., in 802.11] with those in 802.16. For instance, an EAP Identity Request from the AAA server is forwarded to the client, and the EAP Response is forwarded to the AAA server. Similarly, key exchange messages are also mapped from one network to the other by the event mapping. Since both the networks can use the same authentication server, the scheme can support authentication mobility across these networks. This helps avoid complete authentication [while roaming between these networks] and reduces latency.

One of the major challenges that need to be addressed in a seamless mobility scheme is the question of managing IP addresses (e.g., how IP addresses are to be assigned to a multi-mode client). One solution is to assign separate IP address to each interface. However, this solution requires IP address assignment handling when the client switches from one access interface to the other and also adds latency. Example embodiments of the proposed architecture enable the same IP address to be used across both the Wi-Fi and the WiMax network interfaces, and this can be seamless from an application perspective.

Once a station is attached to the network, the data plane is set up by assigning an IP address. As discussed previously, a seamless mobility scheme uses the same IP address across multiple interfaces for a handoff. Therefore, the IP address assignment can be addressed by the Wi-Fi-WiMax mobility service agent. This IP address could be obtained from an external DHCP server, or from a DHCP server internal to the service agent. Since the service agent acts as an anchor, this IP assignment helps in obtaining the same address when the client connects through either interface.

Note that in certain example implementations, the mapping and/or coordinating functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, Wi-Fi access point 32 and/or ASN gateway 40 include software in order to achieve the mapping functionality outlined herein. Wi-Fi access point 32 includes a translating function for mapping purposes such that the translations between events (for Wi-Fi and WiMax) look uniform to ASN gateway 40 and an end user's device. These activities can be facilitated by mapping module 34. In certain example configurations, there is no upgrade required on the client side such that the ASN gateway 40 and/or the end user device does not need to be enhanced in order to be compatible with Wi-Fi access point 32.

Both Wi-Fi access point 32 and ASN-GW 40 can include memory elements for storing information to be used in achieving the mapping operations as outlined herein. Additionally, each of these devices may include a processor that can execute software or an algorithm to perform the mapping activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Figure 3:
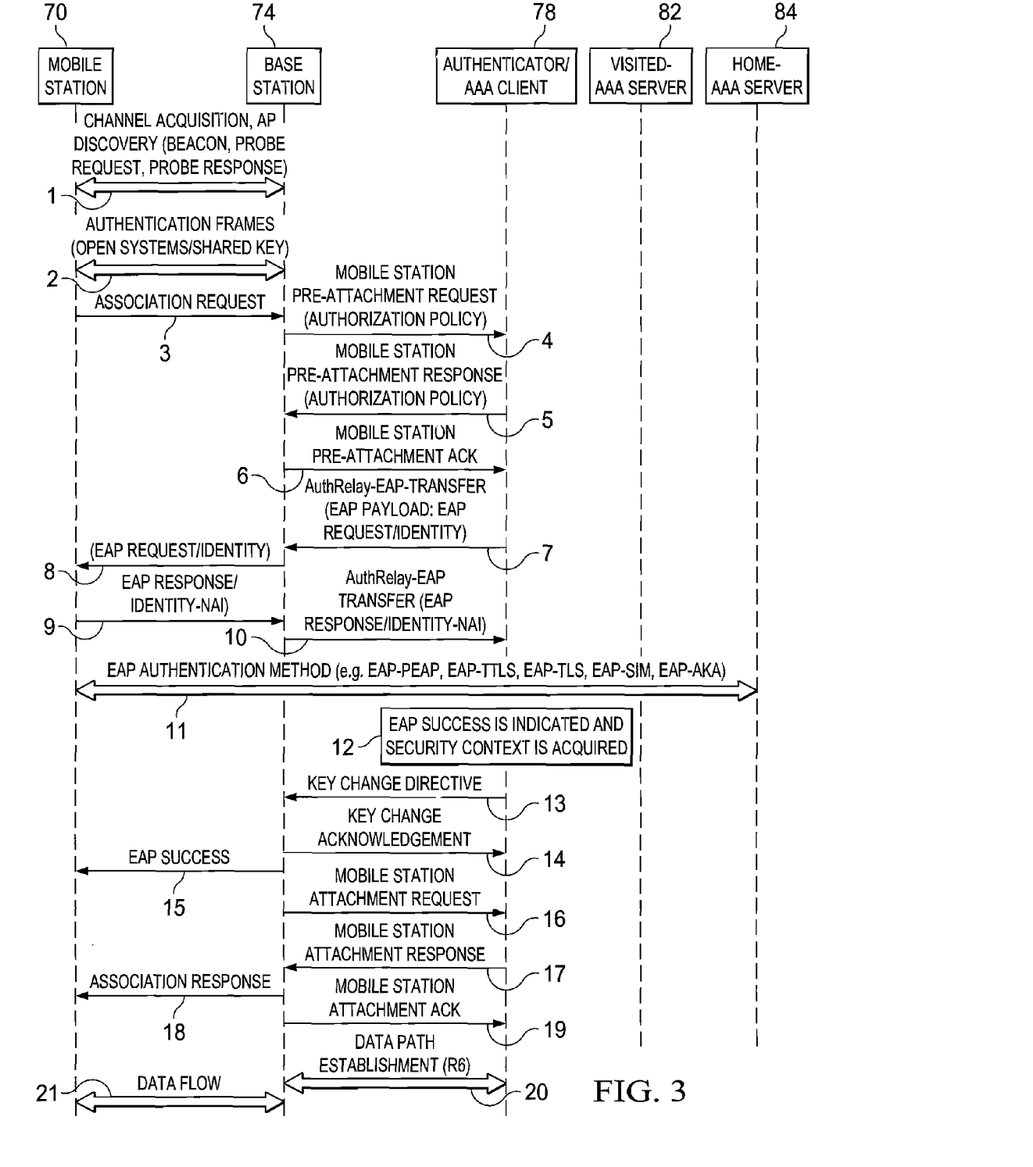
FIG. 3 is a simplified flow diagram illustrating a series of example steps associated with the communication system.

FIG. 3 is a simplified flowchart illustrating an example flow associated with communication system 10. The following steps outline the corresponding mappings between a Wi-Fi flow and a WiMax flow. This particular flow includes interaction between a mobile station (MS) 70, base station 74, authenticator/AAA client 78, visited AAA server 82, and home AAA server 84. This flow is for the initial network entry of the mobile subscriber. The initial stages can consist of the access point sending beacons, the client sending a probe request, and the access point responding with a probe response. The client can then initiate the authentication process by triggering an authentication request. Note that this is not the EAP process, but the 802.11 authentication. The EAP process can be triggered by the client sending an association request frame. The data frames can be processed after data path establishment.

The process begins at step 1, as the 802.11 MS network entry starts. The access point broadcasts beacons, the MS discovers the access point by a probe request, and then receives a response from the access point in the form of probe response. This is followed by the 802.11 authentication (either open systems or shared key) at step 2. At step 3, the MS sends an association request to the base station. The association request can consist of data relating to: capability, listen interval, SSID, supported rates, etc. At step 4, on receipt of an association request, the base station sends a MS pre-attachment request message to its "default" ASN-GW/authenticator to signal that a new MS is entering the network.

The MS pre-attachment request message can contain the MS Information type length value (TLV) containing the authorization policy and base station information (BSINFO) sub-TLVs mobile station information (MSINFO). An authorization policy can have values as follows: bit #1 set 0x02 EAP authorization, bit #2 set 0x04 authenticated-EAP authorization (double-EAP), bits #1, #2 and #4=0 null authentication. Base station Information TLV can include the base station ID Sub-TLV containing the IPv4 address of the base station. The public key management (PKM) protocol version and MAC mode are not necessarily transferred to the authenticator. Receipt of the authorization policy TLV with content other than that specified above will result in the ASN gateway sending a MS pre-attachment response containing a Reject Cause Code sub-TLV in the MSInfo TLV. The Reject Cause Code can indicate an authentication failure.

At step 5, at receipt of the MS pre-attachment request, the selected ASN gateway creates a new context block for the MS ID contained in the R6 message header, and responds to the base station with the MS pre-attachment response message containing the MSINFO and BSINFO TLVs. For the MS Info, the information may include anchor GW/DPF ID sub-TLV

[IPv4 address of the chosen ASN gateway], and authorization policy sub-TLV, authorization policy, [bit #1 set, single EAP]. For the BS Info, that information may include the BS ID sub-TLV reflecting the BSID TLV received in the corresponding MS pre-attachment request.

At step 6, the base station sends a MS pre-attachment ACK message to the ASN. There are no TLVs sent in this message. This is essentially a dummy ACK message because the MS running 802.11 does not understand SBC-RSP message. At step 7, the authenticator in the selected ASN gateway initiates the EAP authentication procedure with the mobile subscriber station. The trigger for this can be the MS pre-attachment ACK message from the base station, informing the ASN-GW that the SBC-RSP has been sent to the MS. The authenticator function of the ASN gateway can send the EAP Request/Identity message to the base station using the R6 AuthRelay-EAP-Transfer message. The ASN gateway should wait for the EAP-Response/Identity message from the mobile subscriber station. If this is not received within the configured timeout, the ASN gateway should retransmit the EAP-Request/Identity via the AuthRelay-EAP-Transfer message.

At step 8, the base station can relay the EAP Request/Identity payload of the Auth-Relay-EAP-Transfer message in the PKMv2 EAP-Transfer/PKM-RSP message to the mobile subscriber station. At step 9, the mobile subscriber station responds with an EAP Response/Identity message containing the network access identifier (NAI). This message is sent to the base station in the PKMv2 EAP-Transfer/PKM-REQ message. At step 10, the base station relays the EAP payload received in PKMv2 EAP-Transfer to the authenticator using the AuthRelay-EAP-Transfer message. At step 11, the EAP payload can be sent to the AAA server from the authenticator via the collocated AAA client using a RADIUS Access-Request message. The EAP payload can be encapsulated in the RADIUS "EAP message" attribute(s). The EAP authentication process (tunneling EAP authentication method) can be performed between the mobile subscriber station and the authentication server via the authenticator function of the ASN gateway. The base station provides a relay of the EAP payload between PKMv2 EAP-Transfer messages and AuthRelay-EAP-Transfer messages. The authenticator function in the ASN gateway can act in passthrough mode (e.g., forward the EAP messages received as a payload from the base station in the AuthRelay-EAP-Transfer messages to the AAA server in a RADIUS Access-Request message). The EAP payload returned from the AAA server in a RADIUS Access-Challenge message can be transferred to the base station in an AuthRelay-EAP-Transfer message. There may be multiple EAP message exchanges between the EAP supplicant, located at the mobile subscriber station, and the EAP Authentication Server, located at the AAA server. The EAP peers, supplicant and authentication server, can negotiate and perform the EAP method. On successful completion of EAP method, security keys (MSK and EMSK) are established at the EAP peers.

At step 12, the authenticator receives a RADIUS Access-Accept message from the AAA server indicating successful completion of EAP-based authentication and, further, includes the MS authorization profile and the required security context (i.e., MSK key). At step 13, the ASN GW/Authenticator sends the key change directive message to the base station to indicate completion of the EAP authentication process. The key change directive contains the MSINFO TLV with the authorization key (AK) Context sub-TLV and also the EAP Payload TLV indicating EAP success. The MS Info may include (but is not limited to): AK, Context AK, AK Lifetime, AK sequence number (SN), AKID, and cipher-based message authentication code (CMAC) KEY Count.

For the EAP payload TLV, when the authentication is complete, a message can be provided as: authentication result=success; PMKv2 Message Code TLV=EAP-Transfer. The AK context has been determined by the ASN gateway based on the MSK received in step 13. This message informs the base station that it should proceed with a PKMv2 3-way handshake (i.e., start the new Key Enforcement and Security Associations creating process). In the case of an authentication failure indication being received from the AAA server in step 12, the subscriber is de-registered from the network using the normal mode [network-initiated] network exit procedure. Although there are no registered paths, the base station can remove any state associated with the mobile subscriber terminal based on the MSID in the R6 message header of the Path Deregistration message.

At step 14, the base station acknowledges receipt of the key change directive message with a Key Change Acknowledgement message. At step 15, the base station sends an EAP-Success message to the mobile subscriber station using a PKMv2 EAP-Transfer message (PKM-RSP). This message is not protected by CMAC. [Note that this message in the initial entry is not protected.] The mobile subscriber station is waiting for the SA-TEK-Challenge from the base station to evaluate the CMAC tuple, and to confirm EAP completion and security keys acquisition.

At step 16, the base station forwards the result of the PKMv2 3-way handshake to the ASN Gateway/authenticator using a MS attachment request message. This message contains the MSINFO and BSINFO TLVs. For the MSInfo, the information may include REG Context (if PMKv2 handshake successful), Key Change Indicator (indicating Success or Failure). For BSInfo (which can be optional), this could include a BSID (e.g., IPv4 address of the base station serving the MS). At step 17, on receipt of the MS Attachment Request, the ASN gateway responds with an MS Attachment Response. This message contains the MSINFO TLV MSInfo, which may include a REG Context. If the REG context from the previous step indicates that the authorized service flows provided by AAA in step 13 cannot be supported, the Reject Cause Code Sub-TLV is included in the MSInfo TLV. The cause code value is set to "Registration Failure." At step 18, the base station sends an association response message to the mobile subscriber station as specified in IEEE 802.11 (e.g., formatting the parameters from an appropriate combination of base station policy and the parameters of the ASN gateway response). The point in time when the REG-RSP is sent is an implementation decision of the base station (e.g., it may be sent before or after performing acknowledging the Registration Context exchange with the ASN gateway). This messaging may include the capability, status code, station ID, and supported rates.

At step 19, the base station sends an MS Attachment Acknowledgement message to the ASN gateway indicating that the association response has been sent to the MS. In the case that the mobile subscriber station does not receive the association response message, it will retransmit the association request message to the base station. At step 20, the ASN gateway initiates creation of the pre-provisioned service flows indicated in the profile received from the AAA in step 12. Data path establishment can occur at this step and the data flow can begin at step 21. For re-authentication, Wi-Fi standards describe the re-association frame in order to associate with a new access point. The re-association frame by the client can be used to trigger a re-authentication procedure in the R6 side.

The initial service flow creation process can be triggered by the ASN gateway. Since there is no flow corresponding to the DSC-Request and the DSC-Response, the base station sends a Path-Reg-Response on receipt of the Path-Reg-Request. The DHCP discover message sent by the subscriber can be suppressed or ignored until the initial path is created. Once the process is complete, the DHCP exchange can be initiated with the client sending a DHCP discover message. The gratuitous ARP message is used to check for duplicate IP addresses. The ARP messages could be subsequently discarded.

In terms of advantages, such an architecture offers a mobility scheme allowing seamless handover across Wi-Fi and WiMax. This can provide a convenient broadband access solution by offering several advantages to both end users and operators. First, the architecture can potentially reduce the amount of time in handover by minimizing the authentication latency. Second, such a configuration can also take a first step in addressing seamless authentication across heterogeneous wireless access. Third, such an architecture can address some of the issues in end-user transparent authentication. It is imperative to note that such a model (as outlined herein) can be extended as a platform to handle mobility across heterogeneous networks in a broader perspective. This would include schemes with latency dependent applications such as voice and video.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIG. 3 illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain AAA, registration, and protocols, communication system 10 may be applicable to other exchanges, routing protocols, or routed protocols in which packets (not necessarily the routing protocol/packets described) are exchanged in order to provide AAA information, QoS parameters, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
providing an Internet Protocol (IP) address based on an authentication request associated with a device, the authentication request being associated with a Wi-Fi protocol;
identifying a plurality of Wi-Fi events associated with the IP address during an authentication phase;
mapping the identified Wi-Fi events to a plurality of WiMAX events, wherein the IP address is used to apply a same quality of service (QoS) across a WiMax network and a WiFi network, and wherein a state relation is maintained for the IP address across the WiMAX network and the WiFi network; and
providing a WiMax message, which is based on a particular one of the Wi-Fi events, to a network element;
wherein the mapping is performed for Wi-Fi events that occur during initial network entry of the device prior to a handoff thereof.

2. The method of claim 1, wherein the mapping further includes converting the particular Wi-Fi event to the WiMax message such that the WiMax message is presented to the network element in a WiMax format.

3. The method of claim 1, further comprising:
communicating a disconnection request to the network element when the device moves from a Wi-Fi coverage area to a WiMax coverage area;
mapping a new WiMax event to a new Wi-Fi event; and
providing a Wi-Fi message, which is based on the new WiMax event, to the device.

4. The method of claim 1, wherein a single authentication protocol is used to gain access to both the Wi-Fi network and the WiMAX network using the IP address.

5. The method of claim 4, wherein the same IP address is used when the device moves from the Wi-Fi network to the WiMax network.

6. The method of claim 1, wherein the same IP address is used for both the particular Wi-Fi event and the WiMax message.

7. The method of claim 1, wherein the identifying includes monitoring a flow for new Wi-Fi events using a daemon provided within an access point.

8. Logic encoded in non-transitory media that includes code for execution and when executed by a processor operable to:

provide an Internet Protocol (IP) address based on an authentication request associated with a device, the authentication request being associated with a Wi-Fi protocol;

identify a plurality of Wi-Fi events associated with the IP address during an authentication phase;

map the identified Wi-Fi events to a plurality of WiMAX events, wherein the IP address is used to apply a same quality of service (QoS) across a WiMAX network and a WiFi network, and wherein a state relation is maintained for the IP address across the WiMAX network and the WiFi network;

provide a WiMAX message, which is based on a particular one of the Wi-Fi events, to a network element;

wherein the mapping is performed for Wi-Fi events that occur during initial network entry of the device prior to a handoff thereof.

9. The logic of claim 8 being further operable to:
convert the particular Wi-Fi event to the WiMAX message such that the WiMAX message is presented to the network element in a WiMAX format.

10. The logic of claim 8, wherein the same IP address is used for both the particular Wi-Fi event and the WiMax message.

11. The logic of claim 8 being further operable to:
communicate a disconnection request to the network element when the device moves from a Wi-Fi coverage area to a WiMax coverage area;
map a new WiMax event to a new Wi-Fi event; and
provide a Wi-Fi message, which is based on the new WiMax event, to the device.

12. The logic of claim 8, wherein a single authentication protocol is used to gain access to both the Wi-Fi network and the WiMAX network using the IP address.

13. The logic of claim 8, wherein the identify logic includes logic to monitor a flow for new Wi-Fi events using a daemon provided within an access point.

14. An apparatus, comprising:
a memory element configured to store data,
a processor operable to execute instructions associated with the data, and
a mapping module configured to:
provide an Internet Protocol (IP) address based on an authentication request associated with a device, the authentication request being associated with a Wi-Fi protocol;
identify a plurality of Wi-Fi events associated with the IP address that occur during an authentication phase;
map each of the identified Wi-Fi events to one of a plurality of WiMAX events, wherein the IP address is used to apply a same quality of service (QoS) across a WiMAX network and a WiFi network, and wherein a state relation is maintained for the IP address across the WiMAX network and the WiFi network; and
provide a WiMAX message, which is based on a particular one of the Wi-Fi events, to a network element.

15. The apparatus of claim 14, wherein the mapping module is further configured to:
convert the particular Wi-Fi event to the WiMAX message such that the WiMAX message is presented to the network element in a WiMax format.

16. The apparatus of claim 14, wherein the mapping module is further configured to:
communicate a disconnection request to the network element when the device moves from a Wi-Fi coverage area to a WiMax coverage area;
map a new WiMax event to a new Wi-Fi event; and
provide a Wi-Fi message, which is based on the new WiMax event, to the device.

17. The apparatus of claim 14, wherein a single authentication protocol is used to gain access to both the Wi-Fi network and the WiMAX network using the IP address.

18. The apparatus of claim 14, wherein the same IP address is used when the device moves from the Wi-Fi network to the WiMax network.

19. The apparatus of claim 14, further comprising:
a daemon configured to monitor a flow for new Wi-Fi events associated with the device.

20. The apparatus of claim 14, further comprising:
a data table included within the memory element and operable to store the mappings between the WiMAX events and the identified Wi-Fi events.

* * * * *